United States Patent [19]

Scott

[11] 4,263,876
[45] Apr. 28, 1981

[54] INSECT ISOLATED ANIMAL FEEDER

[76] Inventor: John H. Scott, 5054 Maple Ave., St. Louis, Mo. 63113

[21] Appl. No.: 21,086

[22] Filed: Mar. 16, 1979

[51] Int. Cl.³ .................. A01K 1/10; A01K 39/01; A01K 39/014
[52] U.S. Cl. .................................................. 119/62
[58] Field of Search .......................... 119/61, 62, 55

[56] References Cited

U.S. PATENT DOCUMENTS

| | | | |
|---|---|---|---|
| 736,522 | 4/1903 | Hopkins | 119/62 X |
| 1,343,093 | 6/1920 | Shoultz | 119/62 |
| 2,618,238 | 9/1950 | Travis | 119/61 |
| 2,677,350 | 5/1954 | Prestidge et al. | 119/61 |
| 3,077,863 | 2/1963 | Chilovich | 119/62 |
| 3,121,419 | 2/1964 | Gillespie | 119/62 |
| 3,176,656 | 4/1965 | Bates | 119/62 |
| 3,503,372 | 3/1970 | Saurer | 119/55 |

FOREIGN PATENT DOCUMENTS 100607 3/1937 Australia .................. 119/62

*Primary Examiner*—S. Leon Bashore
*Assistant Examiner*—Steve Alvo
*Attorney, Agent, or Firm*—Kalish & Gilster

[57] ABSTRACT

An animal feeder maintains animal feed in a protected condition until the feed is desired by an animal. As configured for usage, the feeder includes a feed container of dish character and a support structure supporting the container in a position to be approached by an animal. A cover is carried in hinging relationship for movement between positions covering and uncovering the container. When uncovered, the container is protected from the elements, but when uncovered permits the animal to feed from the feed container. A treadle surrounds at least a portion of the container for being stepped upon by an animal when in any of a plurality of locations near the container. The treadle is interconnected with the cover for causing movement to the open position in response to weight of the animal upon the treadle and for permitting the cover to close when the animal's weight is removed. A fluid container interengageable with the support structure of the apparatus is adapted to be filled with water or other fluid for isolating the food container from ground crawling insects.

3 Claims, 7 Drawing Figures

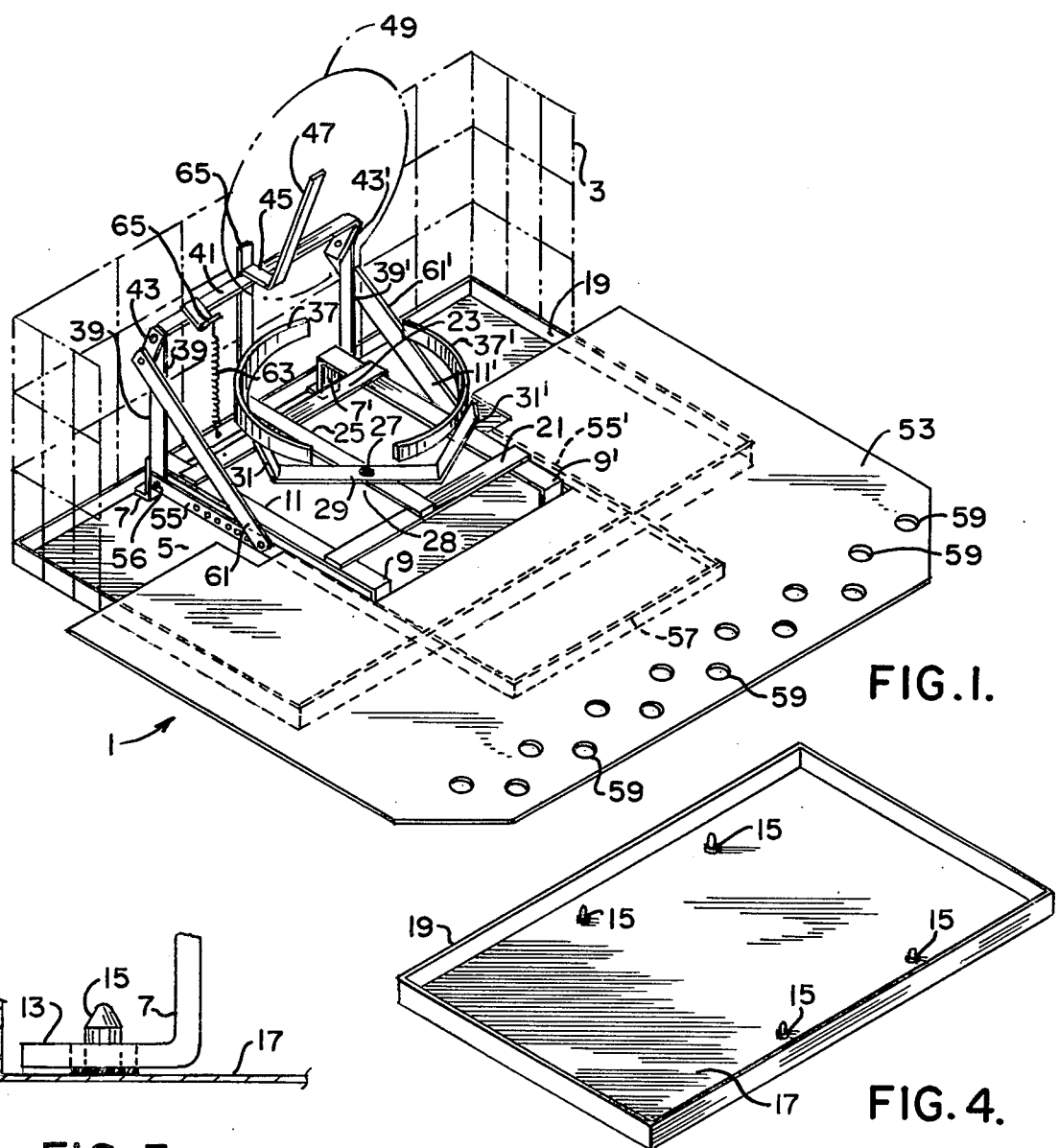
FIG. 1.
FIG. 3.
FIG. 4.
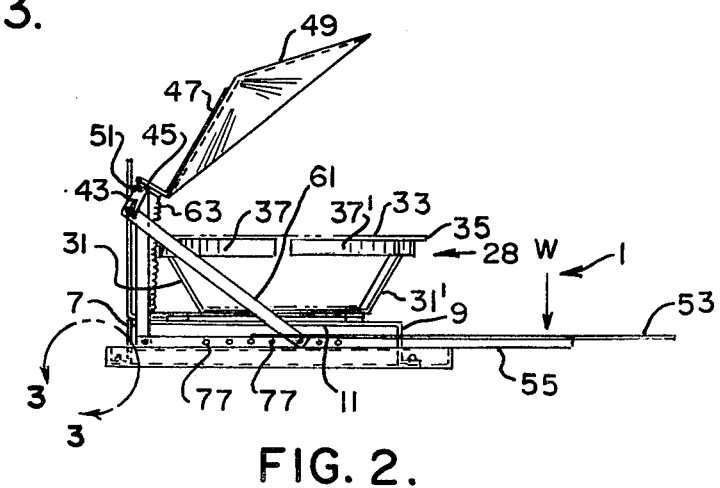
FIG. 2.

INSECT ISOLATED ANIMAL FEEDER

BACKGROUND AND SUMMARY OF THE DISCLOSURE

The invention relates to animal feeders and, more particularly, to animal feeders for dogs and animals of similar size.

Dogs often leave feed between feedings. Even though fed, for example, once a day, a dog may often eat the feed over an extended interval of several hours. During such interval, rain, snow, birds, and insects may get into the feed. In addition, moisture and heat may cause rapid spoilage of the feed even over a relatively short interval.

Even if the dog were to consume the feed over such interval, an open feed pan attracts birds and insects such as ants and flies in a short time. As is well know, flies and other insects lay eggs in the feed which soon grow to larvae. Flies and insects also are vectors for bacteria, viruses, or other microorganisms.

Aside from the prospect of providing spoilage and permitting birds and insects to get into animal feed contained therein, an open pan permits feed to become wetted by rain or snow. If dogs are accustomed to eating feed of the dry type, or even of the pre-moistened type, if the feed becomes soaked by rain, dogs will often not eat it to the detriment of their diet.

Because of the desire to buy animal feed in large sizes for reasons of economy and convenience, it would be desirable if greater amounts of feed could be left in a feed container for feeding of an animal over an extended interval such as two days or more. But, the foregoing problems are compounded if greater amounts of feed are left out and the possibility of spoilage, wastage, or contamination from insects is increased substantially.

Yet another problem which often occurs is that feed pans are easily tipped over by dogs during feeding, being typically unstable vessels and this problem is particularly acute when dogs are of an exuberant nature, and particularly where several dogs are caged.

Accordingly, an object of the invention is the provision of a dog feeder which provides for protection of a feed container by covering the top thereof to prevent rain, snow, birds, insects, or undesired animals (such as squirrels, mice, and the like) from getting into the feed.

Another object of the invention is the provision of such a feeder which tightly closes the top of a feed container for protection of feed therein.

A further object of the invention is the provision of such a feeder which protects against ants, beetles, or other ground crawling species of insects from approaching the container and crawling into feed within the container.

Yet another object of the invention is the provision of such a feeder which supports a dish-type container of conventional size in a position of stability for preventing the same from being tipped over upon feeding of animals therefrom.

Yet another object of the invention is the provision of such a feeder which automatically uncovers such container in response to the weight of an animal in any of a plurality of locations proximate the container and for promptly recovering the container when the animal is finished feeding.

A further object of the invention is the provision of such a feeder which supports a conventional, commercially available feed container and which allows the container to be readily removed for filling, cleaning, or replacement.

A related further object of the invention is the provision of such a feeder which conduces to ready conversion for receiving dish-type feed containers of various different sizes.

Among further objects of the invention may be noted the provision of such a feeder which is constructed of inexpensive materials, which is simply and easily assembled, and which is long-lasting and reliable in use.

Other objects will be in part apparent and in part pointed out hereinbelow.

BRIEF DESCRIPTION OF THE DRAWINGS

FIG. 1 is a perspective view of an animal feeder constructed in accordance with and embodying the invention as utilized in connection with a wire mesh guard around the rear of the feeder.

FIG. 2 is a side elevation of the feeder illustrating a cover thereof in open position.

FIG. 3 is a vertical section taken generally along line 3—3 of FIG. 2 for illustrating the interengagement of a foot of the feeder with a container for fluid as to isolate a feed container of the device from ground crawling insects.

FIG. 4 is a perspective view of the fluid container.

Corresponding reference characters indicate corresponding parts throughout the several views of the drawings.

DESCRIPTION OF THE PREFERRED EMBODIMENT

Figure 5:
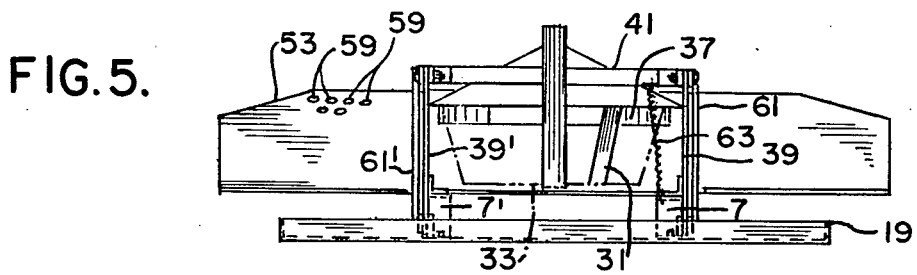
FIG. 5 is a rear elevational view of the feeder.

Referring now to the drawings, illustrated generally at 1 is an animal feeder of the invention, as the same is utilized in conjunction with a guard 3 of wire mesh character which is used to surround the back of the feeder for preventing animals from approaching from such direction. However, it is to be understood that feeder 1 may be utilized in a manner without the guard or by placing the same against a fence or the like taking the place of guard 3.

The new feeder comprises a frame 5 comprising four legs designated 7,7' at the rear and 9,9' at the front, said legs being defined by thin steel bar stock preferably bent to provide the shape indicated. Other elements of the feeder are also of such stock. Two lengths 11,11' of such stock provide side rails of the device which are bent downwardly to form the respective legs 7,7' and 9,9'. Each leg preferably also is rebent parallel to the ground to provide a short extension 13 (FIG. 3) of the respective leg for bearing against the ground or, as more preferably utilized, for engaging a stud 15 extending upwardly from the surface 17 of a shallow, rectangular pan 19, which may contain water or other fluid for isolating a feed dish for purposes explained below. For purposes of supporting a feed dish, side members 11,11' are joineds by lenghts 21,23 of similar stock, being preferably welded to the side members. Extending longitudinally between the front and rear lengths 21,23 centrally of the frame is a further length 25 of such material having pivotally secured at approximately the center thereof, as indicated at 27. A dish support assembly designated generally 28 includes a length 29 of bar stock which extends radially outward in opposite directions from a central securement 27, preferably a nut and bolt, which secures support member 29 and hence assembly 28 to frame member 25. Support member 29 has extensions which extend radially outwardly from securement 27 and then are directed upwardly, as indicated at 31,31' in generally conformal angular relationship to the outer surface of feed container 33 (FIG. 2) which simply may be an aluminum or enameled steel dish or other commercially available pan of conventional depth and appropriate diameter for fitting within the upwardly extending portions 31,31' of the support structure. The respective upward extensions 31,31' of support member 29 are provided with arcuate sections 37,37' which may, as with the other materials employed in constructing the feeder, be of thin bar stock suitably bent to fit beneath the rim 35 of pan 33 for supporting the same. As will be observed, the central nut and bolt securement 27 of the pan support base member 29 to frame member 25 may be loosened to lift base member 29 from frame member 25. In this way, the pan support assembly 28 may be simply removed and replaced with one of figuration or size which is different for accommodating a different shape or size of pan 33. A noteworthy attribute of the construction is that dish 33 may simply be lifted from support assembly 28 for cleaning, filling or replacement.

Extending upwardly from the opposite sides of frame side members 11,11' from locations proximate the rear legs 7,7' are opposite vertical side members 39,39' also of bar stock. Pivotally secured to the upper ends of these members 39,39' and bridging them is a horizontal member 41 having short extensions 43,43' at opposite ends of member 41 and forming right angles thereto for providing the pivotal interconnection of member 41 with upright members 39,39'. Located centrally of horizontal member 41 is a short length 45 of stock extending perpendicularly to the longitudinal axis of member 41, said member 45 being intergrally joined to a cover operating extension 47 to which a cover 49 of conical shape is secured, as by welding or riveting. Cover 49 may be formed of a galvanized steel sheet material. Arm 45 is welded or riveted to horizontal member 41 and hence the pivotal securement of extensions 43,43' of the latter provide for pivoting movement of cover 49 about an axis (FIG. 2) for movement of cover 49 between positions covering or uncovering pan 33. In FIG. 2, the cover is shown in the open position permitting an animal to approach pan 33 for feeding therefrom.

For actuating cover 49 and causing opening thereof, a linkage interconnects a treadle 53 for applying force to structural arm extensions 43,43' which thus act as lever arms to open cover 49 in response to the weight W of an animal approaching the feeder, said weight bearing downwardly as illustrated in FIG. 2 to treadle 53.

Treadle 53 is configured in a U-shape for surrounding portions of the feeder, and particularly dish 33 whereby an animal approaching the feeder from any of a plurality of locations proximate dish 33 may cause actuation of cover 49.

The actuation mechanism comprises a pair of frame members 55,55' located on opposite sides of frame 5 and pivotally secured thereto as illustrated at 56 (See FIG. 1) as by means of screw and nut arrangement or a rivet, etc. Said frame members 55,55' are interengaged at their distal ends by a horizontal member 57 underlying treadle 53. Members 55,55' and interconnecting member 57 all may be formed of a single piece of flat stock bent to provide the shape apparent from FIG. 1, the same being either spot welded or pop riveted by means of brackets or the like to the undersurface of treadle 53.

Treadle 53 is preferably of a thin sheet of galvanized steel or the like and is preferably perforated to provide a plurality of apertures 59 for the purpose of lightening the same and providing a non-slip, self-cleaning character. Alternatively, treadle 53 may be of relatively fine guage steel mesh material having the requisite strength to prevent bending or twisting under the weight of a large dog or other animal to be fed by the new apparatus.

Interengaging the pivot remote end of cover support member extensions 43,43' and pivotally mounted frame members 55,55' are links 61,61' at opposite sides of the structure, said links foregoing members at opposite ends thereof whereby downward movement of frame members 55,55' in response to the weight W of an animal stepping upon treadle 53 will cause cover 49 to be raised as illustrated in FIGS. 1 and 2.

Figure 6:
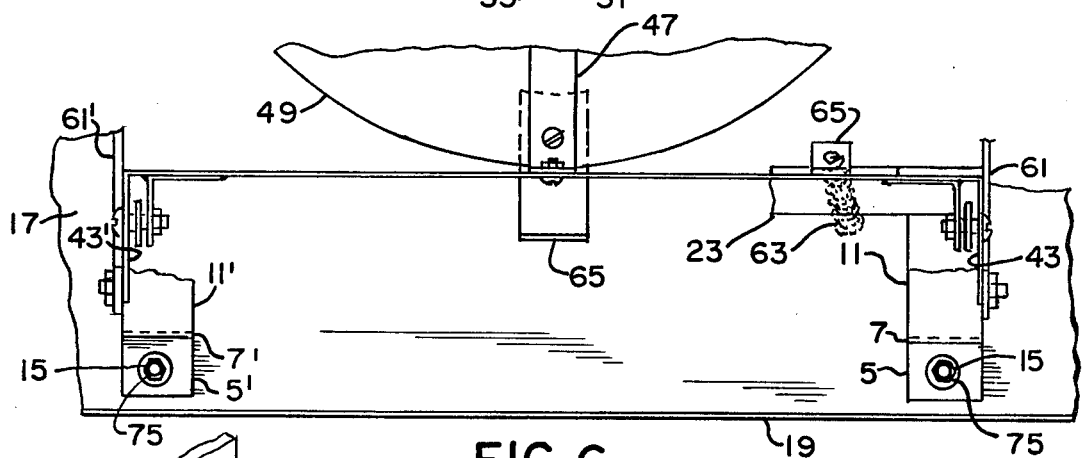
FIG. 6 is a top elevational view of portions of the feeder illustrating a cover actuation mechanism of the feeder.

When the animal removes its weight from treadle 53, a coil tension spring 63 causes the cover to return to the closed position. For this purpose, the spring is secured to a bracket 65 extending outwardly from member 41 in the same general direction as extension 45 securing cover 49, one end of the spring 63 being secured to the latter and the other to frame member 23 (See FIG. 6). To limit upward movement of cover 49 during opening, member 25 is provided with an upwardly extending portion 65 at its rearward extent to provide a resilient length of material adapted to be engaged by cross member 41 when cover attachment 47 reaches the position shown in FIG. 1. Said upright extension 65 may also be utilized for securement of the new device to a stake or fence post or the like for fixedly locating the new feeder in a desired position within a cage or other feeding area.

Figure 7:
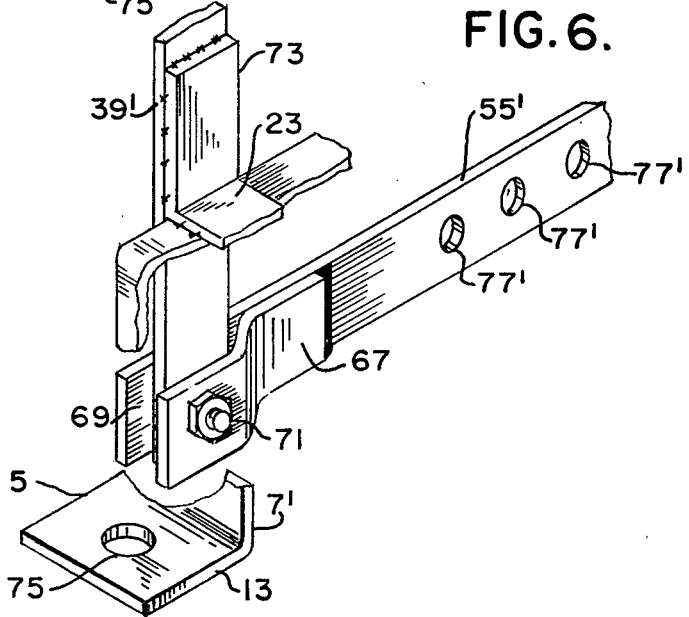
FIG. 7 is a perspective view of portions of support structure and cover actuating mechanism of the feeder.

The preferred method of securement of each of the pivotal arms 55,55' is illustrated in FIG. 7 wherein arm 55' is shown to have secured thereto a short jogged length 67 of bent stock, being welded to the proximal end of arm 55' to provide in effect a yoke 69 which surrounds and is bolted to upright member 39' as indicated at 71 for pivotal movement. Also for purposes of strength, transverse frame member 23 is shown to have a short upright extension 73 which is welded to upright member 39'.

Pan 19 is adapted to be filled with water or other liquid (such as a mild antiseptic or insecticidal solution) whereby ants and other ground crawling insects are effectively prevented from reaching feed dish 33, the latter in this way being quite well isolated from the ground and from such ground crawling insects. To maintain the frame members in a fixed centrally located position within pan 19, the latter is provided with four of the previously described studs, each adapted to extend through a respective aperture 75 (See FIG. 7) in the foot, e.g., as indicated at 5' of each leg. Studs 15 are preferably of the commercially available type resembling a short dull nail, but conveniently spot riveted to the upper surface 17 of pan 19. When closed, the conical cover 49 is seen to provide excellent protection against snow, rain, as well as pests such as flies or other insects which might enter dish 33 for contamination of feed contained therein. However, the conical surface of cover 49 provides also the advantage of allowing moisture to run off into pan 19 for maintaining the same in a filled condition thereby to further ensure that the pan will not dry up to permit ants or other crawling insects to approach feed pan 33.

It is accordingly seen that cover 49 and treadle 53 are hingedly secured to base or frame 5 with treadle 53 extending outwardly from said base without contacting the ground surface upon which pan 19 rests and thereby upon which the new feeder is seated. Pan 19 and the fluid therein extend beneath a substantial portion of treadle 53. Thus, base 5, cover 49, treadle 53, support elements 28 and feed pan 33 are all fully isolated from the ground surface with only legs 7,7' and 9,9' being in contact with the fluid in pan 19.

It is to be observed that the elevation of treadle 53 for opening in response to dogs of various sizes can be adjusted. For this purpose, arms 61,61' are each adapted to be secured to arms 55,55' at any of a plurality of corresponding apertures 77,77'. In this way, the height of treadle 53 for dogs of varying sizes is readily changed. Also, spring 63 may be sized or utilized in pairs so that a spring constant is obtained which is appropriate for causing opening of cover 49 in response to an animal weight W which is not less than that of the front paws, for example, of a dog to utilize the feeder. In this way, the cover is prevented from opening in response to the scampering across treadle 53 of a squirrel, rabbit, cat or other smaller animal for which the feeder is not intended.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What I claim and desire to be secured by U.S. Letters Patent is:

1. An animal feeder for maintaining animal feed in a protected, insect-isolated condition until said feed is desired by an animal, said feeder comprising an animal feed container of dish character, support means for supporting said container is a position for being approached by an animal for feeding, a cover supported in hinging relationship for movement between a covering position extending across the top of said container for covering said container and an uncovering position removed from the top of said container for uncovering said container to permit access to said container by an animal for feeding therefrom, a treadle adapted for receiving the weight of an animal upon approaching said container, said treadle extending in front of and also along the sides of said container whereby said treadle will be stepped upon by an animal when in any of a plurality of locations proximate said container, means connected to said support means and interconnecting said treadle and said cover for causing movement of said cover from said covering position to said uncovering position in response to said animal weight upon said treadle, means carried by said support means for causing movement of said cover from said uncovering position to said covering position in response to removal of said animal weight from said treadle, and a fluid container for surrounding and extending fully under said feed container and support means, means for locating said support means within said fluid container and for providing selective interengagement of said support means to, and independent detachment of said support means from, said fluid container, said fluid container being dimensioned to contain a fluid for isolating said feed container and said support means from ground crawling insects, said support means comprising a base and support elements removably secured to said base for supporting said feed container, said base having a plurality of legs, said fluid container comprising a pan for seating of said legs therein with said legs within said fluid, said means for locating said support means within said fluid container comprising a plurality of studs for engaging corresponding apertures in said legs, wherein said base, said cover, said treadle, said support elements, and said feed container are all fully isolated from said ground surface with only said legs being in contact with said fluid.

2. An animal feeder according to claim 1 said support means comprising a base and arcuate support elements adapted for supporting the rim of a circular feed dish constituting said feed container, and a securement element carrying said support elements, said securement element being removably secured to said base at a single point of securement centered beneath said feed dish for being easily removed and replaced to provide support elements of various dimensions respectively suitable for feed dishes of various diameters.

3. An animal feeder according to claim 2, said cover and said treadle being hingedly secured to said base, said treadle extending outwardly from said base without contacting a ground surface upon which ground surface said animal feeder is seated, said pan and fluid therein extending beneath at least a portion of said treadle.

* * * * *